(12) United States Patent
Hong (10) Patent No.: US 8,143,761 B2
(45) Date of Patent: Mar. 27, 2012

(54) MOTOR ASSEMBLY (75) Inventor: Yin-Rong Hong, Kaohsiung (TW)

(73) Assignee: NS Micro Motor Technology Corp., New Taipei (TW)

( * ) Notice: Subject to any disclaimer, the term of this patent is extended or adjusted under 35 U.S.C. 154(b) by 131 days.

(21) Appl. No.: 12/818,419

(22) Filed: Jun. 18, 2010

(65) Prior Publication Data

US 2011/0241452 A1    Oct. 6, 2011

(30) Foreign Application Priority Data

Mar. 30, 2010   (TW) ................................ 99109592 A (51) Int. Cl.
 *H02K 1/18*  (2006.01)
 *H02K 5/16*  (2006.01)
 *H02K 5/02*  (2006.01)
(52) U.S. Cl. .................. 310/216.113; 310/425; 310/91; 310/90; 310/67 R
(58) Field of Classification Search ........... 310/216.113, 310/43, 425, 90, 91, 67 R
See application file for complete search history.

(56) References Cited

U.S. PATENT DOCUMENTS

| 5,610,462 | A | * | 3/1997 | Takahashi ....................... 310/90 |
| 6,072,261 | A | * | 6/2000 | Lin .............................. 310/424 |
| 6,847,141 | B2 | * | 1/2005 | Wang ............................. 310/91 |
| 6,882,074 | B2 |   | 4/2005 | Horng et al. |

\* cited by examiner

*Primary Examiner* — Quyen Leung
*Assistant Examiner* — Leda Pham
(74) *Attorney, Agent, or Firm* — Frommer Lawrence & Haug LLP; Ronald R Santucci (57) ABSTRACT

A motor assembly includes a flexible base mount having an integrally formed axial tube, support ledges disposed on the axial tube to axially support a stator disposed on the axial tube to be firmly engaged with the stator for further ensuring immobility, a flexible mounting shell member axially insertable into the axial tube and having a receptacle cap at a lower end thereof, retaining and retained members disposed between the mounting shell member and the axial tube to guard relative movement therebetween, and an antifriction bearing disposed in the mounting shell member to bear a revolving shaft of a rotor. All the constituted components can be standardized and modularized. With such simple construction, the motor assembly can be easily assembled.

11 Claims, 10 Drawing Sheets

MOTOR ASSEMBLY

CROSS-REFERENCE TO RELATED APPLICATION

This application claims priority of Taiwanese patent Application No. 099109592, filed on Mar. 30, 2010, the disclosure of which is herein incorporated by reference.

BACKGROUND OF THE INVENTION

1. Field of the Invention

This invention relates to a motor assembly, more particularly to a brushless electric motor assembly having an axial tube for reliably positioning an antifriction bearing.

2. Description of the Related Art

Figure 1:
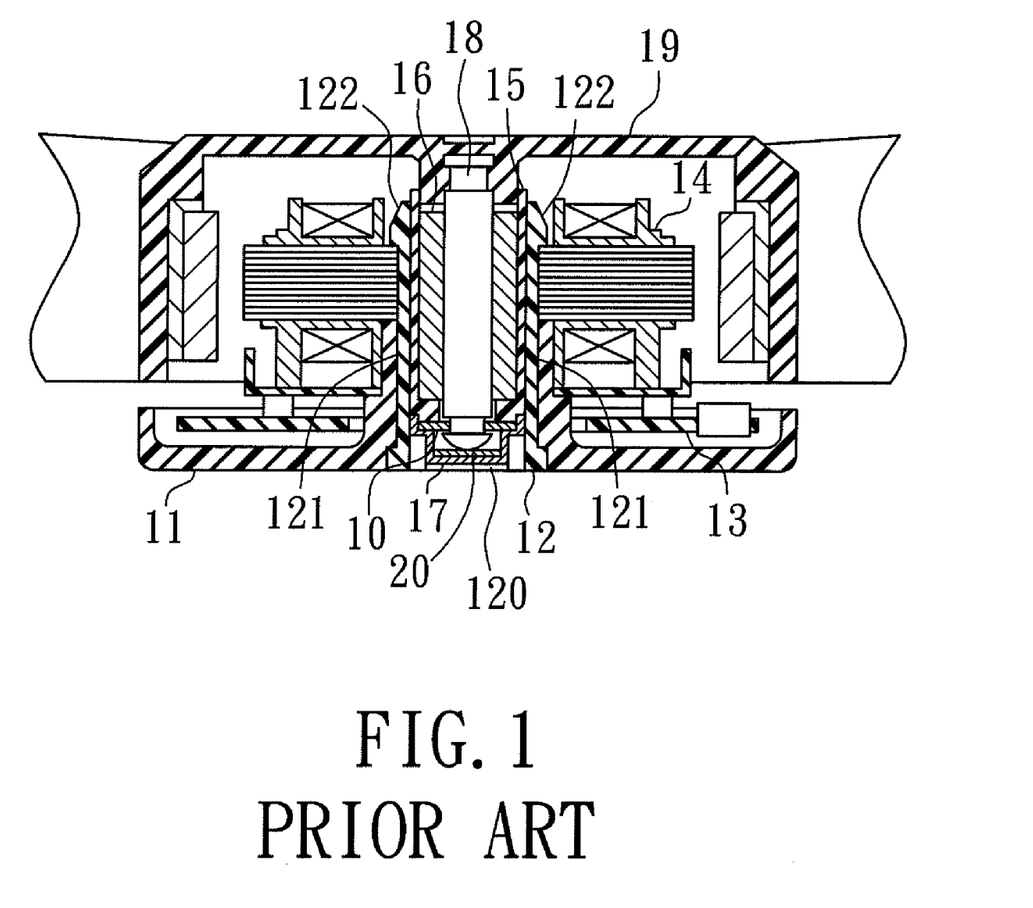
FIG. 1 is a sectional view of a conventional motor assembly disclosed in U.S. Pat. No. 6,882,074 B2.

Referring to FIG. 1, a motor structure disclosed in U.S. Pat. No. 6,882,074 B2 includes a stator 14 and a circuit board 13 which are engaged together and which are mounted to a hollow tube of a casing 11, and an axial tube 12 mounted into and in splined engagement with the hollow tube of a casing 11 from a bottom end of the hollow tube such that hook portions 122 of a plurality of resilient arms 121 are brought into engagement with the stator 14. A positioning ring 10, a supporting member 17, and an abrasion-resisting plate 20 are mounted into the axial tube 12. A sleeve 15 having a bearing 16 mounted therein is inserted into and is tightly engaged in the axial tube 12. A shaft 18 of a rotor 19 is extended through the bearing 16 and the positioning ring 10. Since the axial tube 12 and the sleeve 15 exert forces to each other, the sleeve 15 is tightly engaged with the bearing 16 and the resilient arms 121 are securely engaged with the stator 14.

However, such motor assembly has a large number of components, thereby resulting in inconvenience during fabrication and low assembling reliability. Moreover, with the opened-ended sleeve 15, lubricating oil between the bearing 16 and the shaft 18 may be squeezed out from the bottom of the sleeve 15 by the weight thereof so as to adversely affect running of the shaft 19 and make a noise.

SUMMARY OF THE INVENTION

An object of the present invention is to provide a motor assembly which has a few number of components and which enables a shaft of a rotor to revolve smoothly and steadily.

According to this invention, the motor assembly includes a base mount including a base seat which has an inner periphery that surrounds an axis to define a central hole therein, and an axial tube which extends along the axis from the inner periphery to terminate at an upper peripheral end. The axial tube has inner and outer tubular surfaces radially opposite to each other. A plurality of support ledges are disposed on the outer tubular surface and are angularly displaced from one another about the axis. A stator winding subassembly includes a plurality of laminated cores which are disposed to surround the outer tubular surface of the axial tube, and which are supported by resting on the support ledges. A plurality of abutments are angularly displaced from one another about the axis, and are disposed on the outer tubular surface of the axial tube adjacent to the upper peripheral end. Once the upper peripheral end is urged outwardly and radially by virtue of a radial pressing force exerted on the inner tubular surface, the abutments are brought into firm engagement with the laminated cores, thereby ensuring immobility of the laminated cores between the support ledges and the abutments. Upper and lower retaining members are disposed on the inner tubular surface of the axial tube and are opposite to each other relative to the axis. A mounting shell member is made from a flexible material, and is insertable into the axial tube from one of the upper peripheral end and the inner periphery. The mounting shell member includes a tubular shell wall which surrounds the axis, and which has inner and outer shell surfaces radially opposite to each other, and a receptacle cap disposed to engage the inner shell surface. Upper and lower retained members are disposed on the outer shell surface of the mounting shell member, and are configured such that, immediately after the mounting shell member is inserted into the axial tube, the upper and lower retained members are respectively in axial frictional engagements with the upper and lower retaining members so as to guard against axial movement of the mounting shell member relative to the axial tube. A rotor subassembly includes a revolving shaft extending along the axis. An antifriction bearing is disposed between the revolving shaft and the inner shell surface of the mounting shell member to permit the revolving shaft to revolve about the axis, and has an upper end and a lower end that is disposed to rest on the receptacle cap. An upper positioning ring is sleeved on the revolving shaft and is configured to rest on the upper end of the antifriction bearing.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is described in greater detail, it should be noted that same reference numerals have been used to denote like elements throughout the specification.

Figure 2:
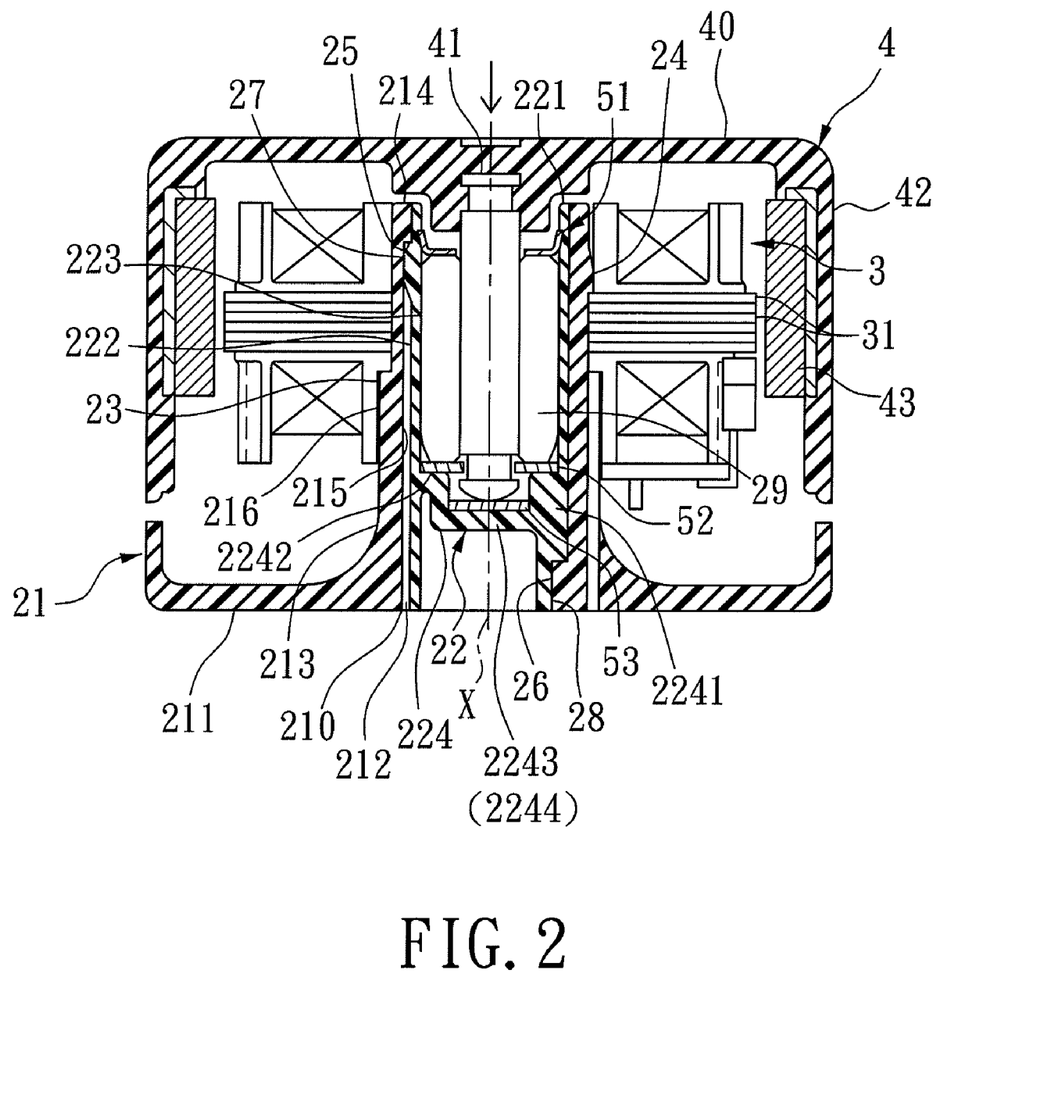
FIG. 2 is a sectional view of the first preferred embodiment of a motor assembly according to this invention.
Figure 3:
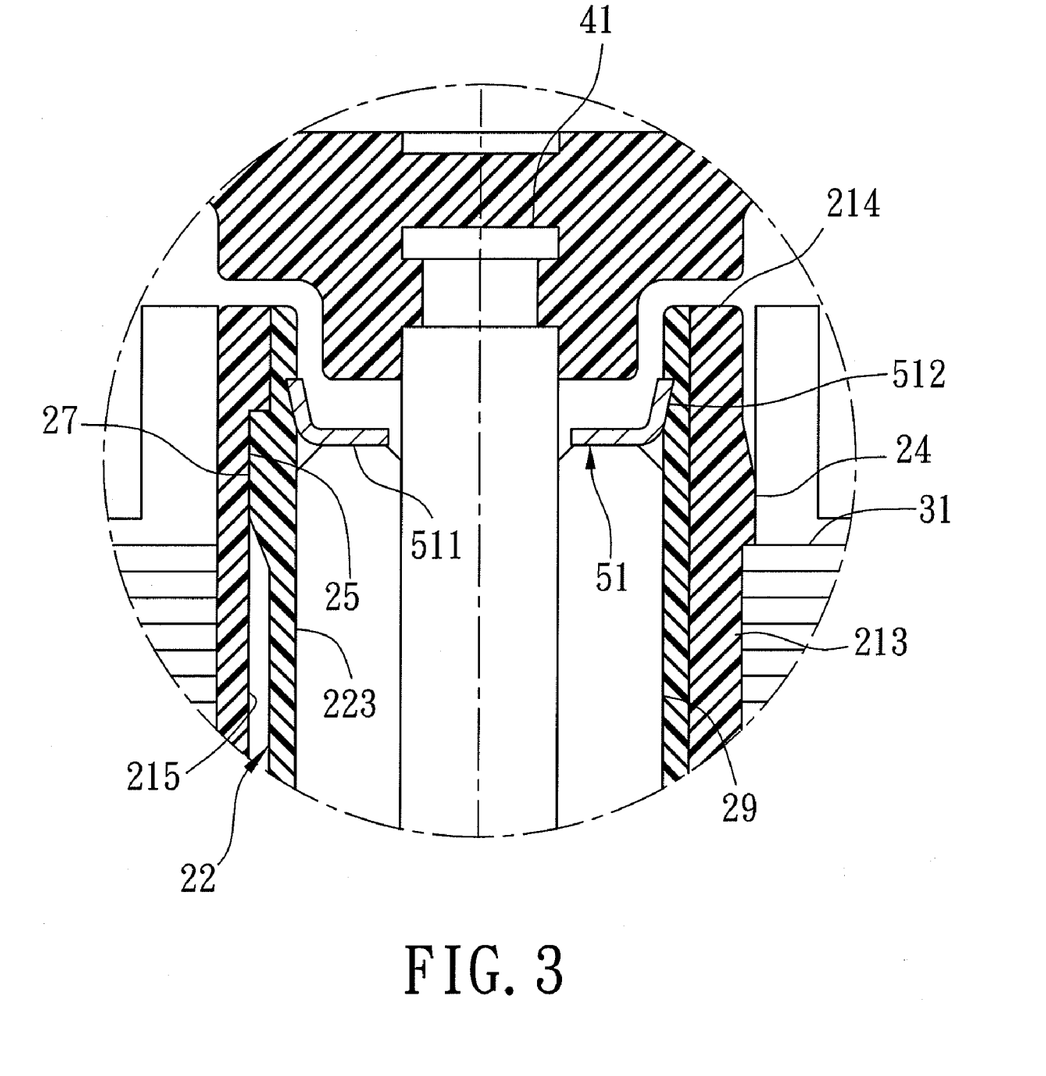
FIG. 3 is an enlarged sectional view of a portion of the first preferred embodiment.

Referring to FIGS. 2 and 3, the first preferred embodiment of a motor assembly according to the present invention is shown to comprise a base mount 21, a plurality of support ledges 23, a plurality of abutments 24, upper and lower retaining members 25,26, a stator winding subassembly 3, amounting shell member 22, upper and lower retained members 27,28, a rotor subassembly 4, an antifriction bearing 29, upper and lower positioning rings 51, 52, and an abrasion-resisting pad 53.

The base mount 21 includes a base seat 211 which has an inner periphery 210 that surrounds an axis (X) to define a central hole 212 therein, and an axial tube 213 which extends along the axis (X) from the inner periphery 210 to terminate at an upper peripheral end 214. The axial tube 213 has inner and outer tubular surfaces 215,216 radially opposite to each other. The support ledges 23 (only one is shown in FIG. 2) are disposed on the outer tubular surface 216 and are angularly displaced from one another about the axis (X). The abutments 24 (only one is shown in FIG. 2) are angularly displaced from one another about the axis (X), and are disposed on the outer tubular surface 216 adjacent to the upper peripheral end 214. The upper and lower retaining members 25,26 are disposed on the inner tubular surface 215 and are opposite to each other relative to the axis (X). In this embodiment, the base mount 21 is made from a flexible plastic material, and the axial tube 213 is integrally molded with the base seat 211 to form the base mount 21 into a single-piece structure.

The stator winding subassembly 3 includes a plurality of laminated cores 31 which are disposed to surround the outer tubular surface 216 of the axial tube 213, and which are supported by resting on the support ledges 23.

Figure 5:
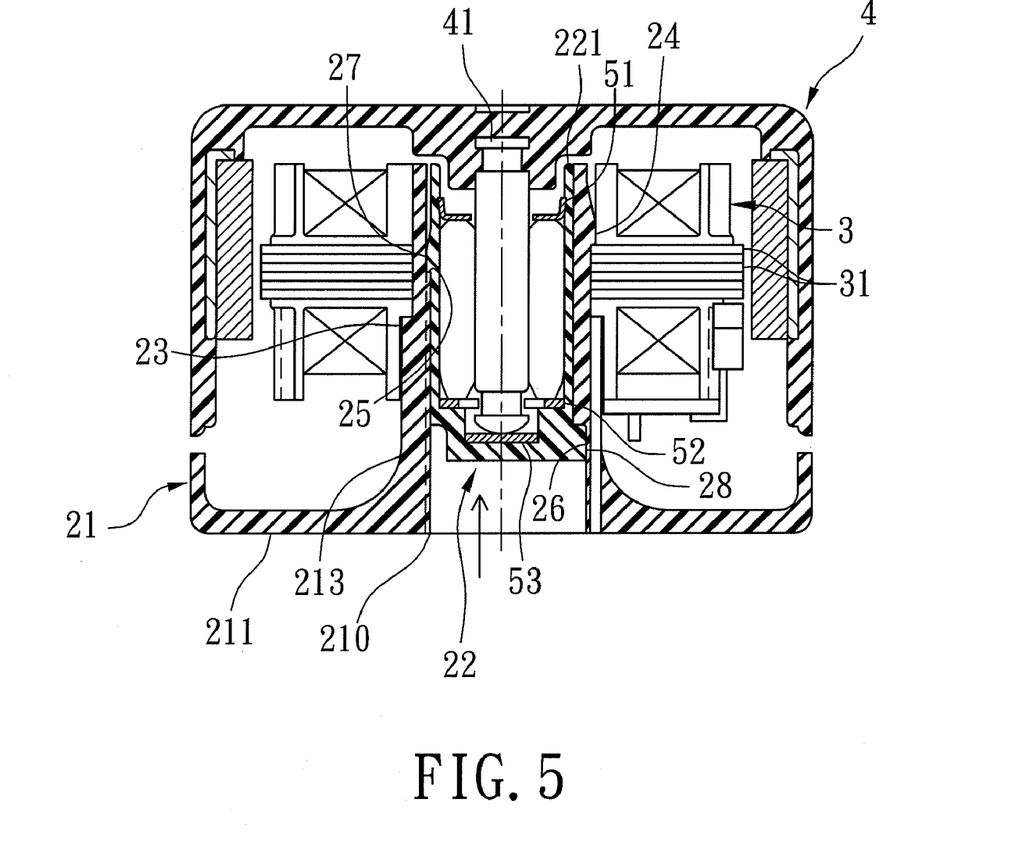
FIG. 5 is a sectional view of the third preferred embodiment according to this invention.

The mounting shell member 22 is insertable into the axial tube 213 from the upper peripheral end 214 (as indicated by an arrow in FIG. 2) or the inner periphery 210 (as indicated by an arrow in FIG. 5). The mounting shell member 22 includes a tubular shell wall 221 which surrounds the axis (X), and which has inner and outer shell surfaces 223,222 radially opposite to each other, and a receptacle cap 224. The receptacle cap 224 has an annular flange portion 2241 which surrounds the axis (X), and which extends radially and outwardly to engage with the inner shell surface 223 so as to form an annular shoulder surface 2242 that faces upwardly, and a receptacle body 2243 which extends from the annular flange portion 2241 downwardly to terminate at a bottom bearing surface 2244. In this embodiment, the mounting shell member 22 is made from a flexible plastic material, and the receptacle cap 224 is integrally molded with the tubular shell wall 221 to form the mounting shell member 22 into a single-piece structure. The upper and lower retained members 27,28 are disposed on the outer shell surface 222 of the mounting shell member 22.

In this embodiment, the upper retaining member 25 and the upper retained member 27 are configured to cooperatively constitute a snap-fit mechanism, such as a block and a recess. Thus, immediately after the mounting shell member 22 is fully inserted into the axial tube 213 from one of the upper peripheral end 214 and the inner periphery 212, the upper retained member 27 is snapped into axial frictional engagement with the upper retaining member 25. In addition, the lower retaining member 26 and the lower retained member 28 are in the form of upward and downward step portions, respectively, so as to be axially and frictionally engaged with each other, thereby guarding against the axial movement of the mounting shell member 22 relative to the axial tube 213.

Moreover, with axial insertion of the mounting shell member 22 into the axial tube 213, the upper peripheral end 214 of the axial tube 213 is urged outwardly and radially by virtue of a radial pressing force exerted on the inner tubular surface 215. Thus, the abutments 24 are brought into firm engagement with the laminated cores 31, thereby further ensuring immobility of the laminated cores 31 between the support ledges 23 and the abutments 24.

The rotor subassembly 4 includes a cup base body 40 disposed to hang over the stator winding subassembly 3, a surrounding wall 42 suspended from a periphery of the cup base body 40 to surround the laminated cores 31, a plurality of permanent magnets 43 disposed on the surrounding wall 42 to confront the laminated cores 31, and a revolving shaft 41 extending from a central area of the cup base body 40 along the axis (X) and having a frictional revolving end brought to rest on the bottom bearing surface 2244 of the receptacle cap 224.

The antifriction bearing 29 is disposed between the revolving shaft 41 and the inner shell surface 223 of the mounting shell member 22 to permit the revolving shaft 41 to revolve about the axis (X). In this embodiment, the antifriction bearing 29 is a bearing housing 29.

The upper positioning ring 51 has a ring base 511 sleeved on the revolving shaft 41 and resting on an upper end of the antifriction bearing 29, and a skirt portion 512 disposed to flare from the ring base 511, and configured to urge against the inner shell surface 223 of the mounting shell member 22 so as to exert the radial pressing force on the inner tubular surface 215 of the axial tube 213.

The lower positioning ring 52 is disposed between a lower end of the antifriction bearing 29 and the annular shoulder surface 2242, and is configured to fittingly permit the revolving shaft 41 to pass therethrough while guarding against movement of the frictional revolving end of the revolving shaft 41 away from the bottom bearing surface 2244.

The abrasion-resisting pad 53 is disposed between the bottom bearing surface 2244 of the receptacle body 224 and the frictional revolving end of the revolving shaft 41 so as to increase wearability of the bottom bearing surface 2244.

As illustrated, in assembly, by axial insertion of the mounting shell member 22 into the axial tube 213, and by virtue of the engagement of the upper and lower retained members 27,28 with the upper and lower retaining members 25,26, the axial tube 213 can be sandwiched tightly between the mounting shell member 22 and the laminated cores 31 to constitute a firm assembly. Hence, the antifriction bearing 29 and the revolving shaft 41 can be mounted within the mounting shell member 22 and precisely extend along the axis (X), thereby reducing errors during assembly and reducing fabricating costs. Moreover, since the base mount 21 and the mounting shell member 22 may be made from plastic material, the manufacturing cost is low and wearing of the antifriction bearing 29 by the inner shell surface 223 can be reduced. Furthermore, by virtue of the upper and lower positioning rings 51,52, and with the receptacle cap 224 formed at a lower end of the mounting shell member 22, leakage of lubricating oil can be prevented.

All the constituted components of the motor assembly according to this invention can be standardized and modularized. With such simple construction, the motor assembly can be easily assembled.

Figure 4:
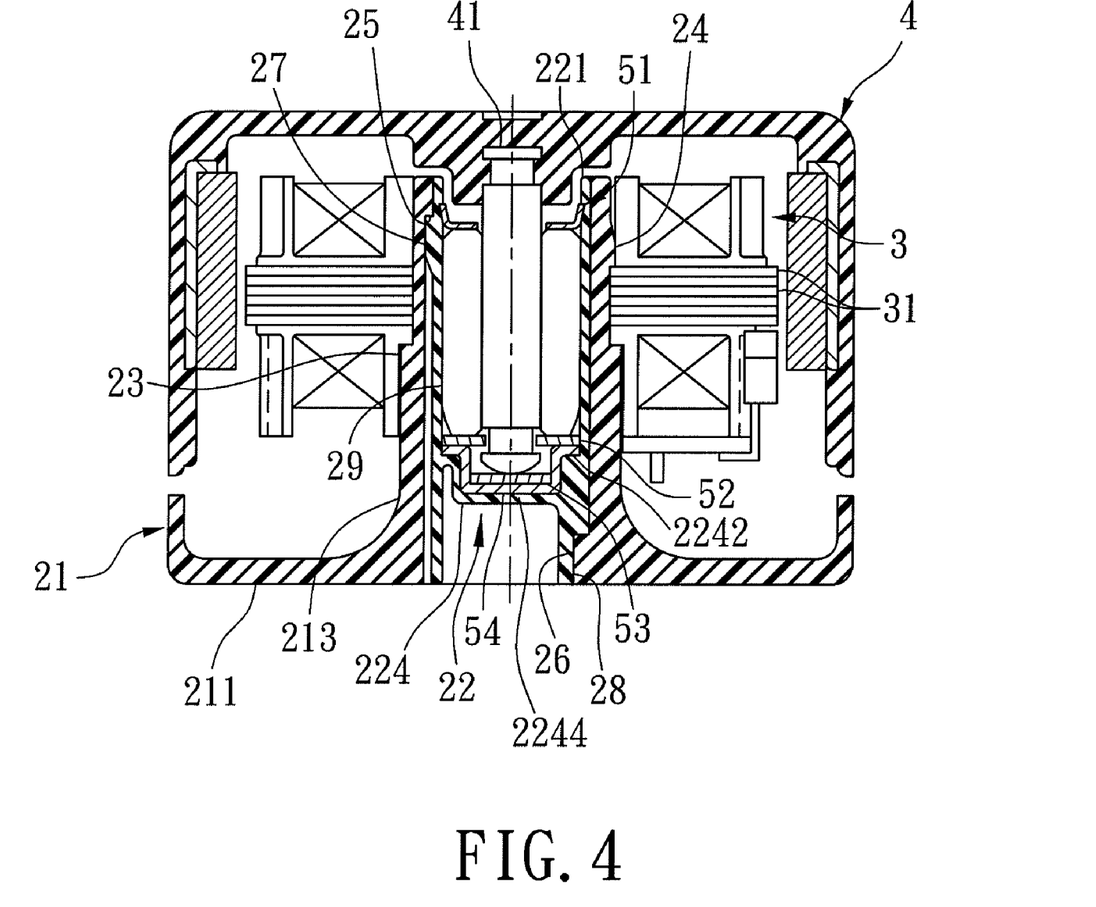
FIG. 4 is a sectional view of the second preferred embodiment according to this invention.

Referring to FIG. 4, the second preferred embodiment of the motor assembly according to this invention differs from the first embodiment in that a support member 54 is made of a rigid material, such as metal, and is configured to be superimposed on the annular shoulder surface 2242 and the bottom bearing surface 2244 to provide a support for the lower positioning ring 52 and the abrasion-resisting pad 53.

Figure 6:
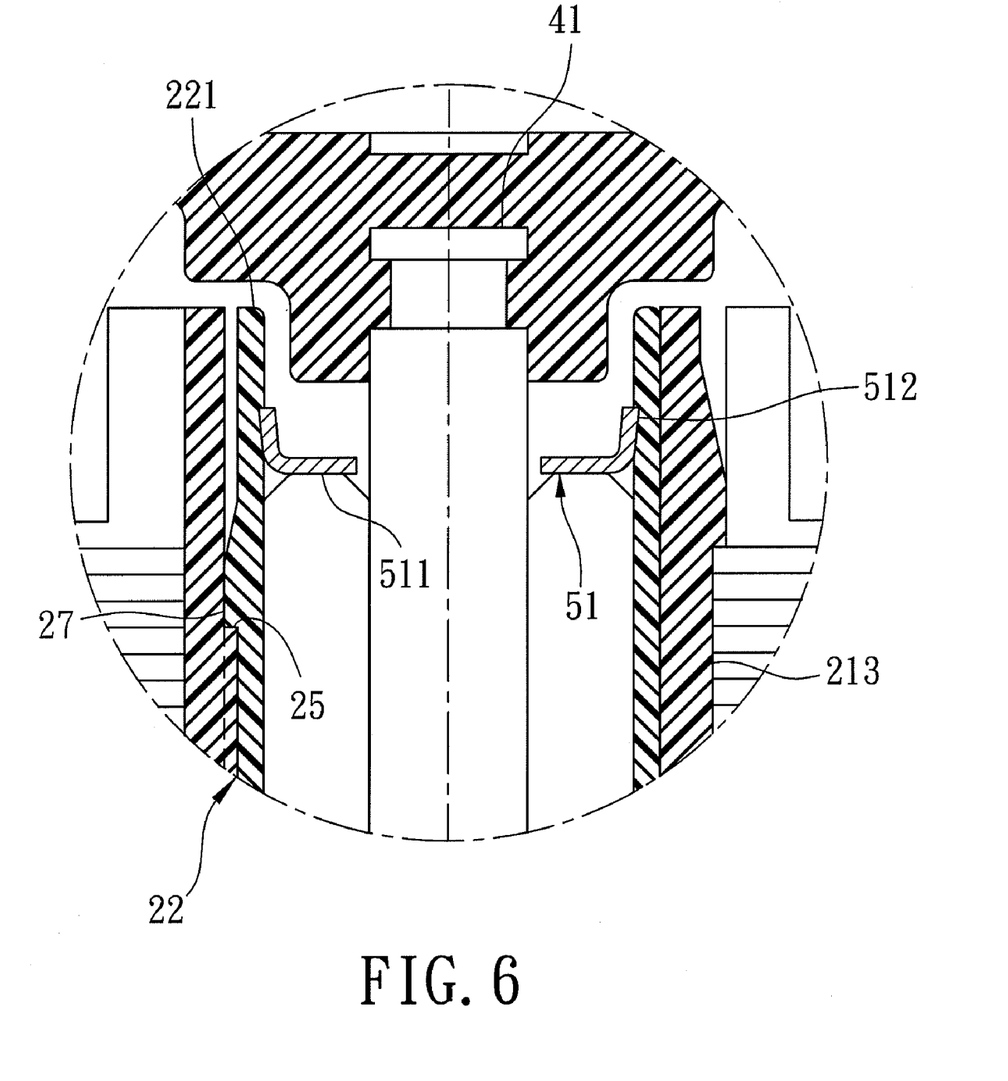
FIG. 6 is an enlarged sectional view of a portion of the third preferred embodiment.

Referring to FIGS. 5 and 6, the third preferred embodiment of the motor assembly according to this invention differs from the first embodiment in that the lower retaining member 26 and the lower retained member 28 are in the form of downward and upward step portions, respectively, such that the mounting shell member 22 is insertable into the axial tube 213 from the inner periphery 210.

Figure 7:
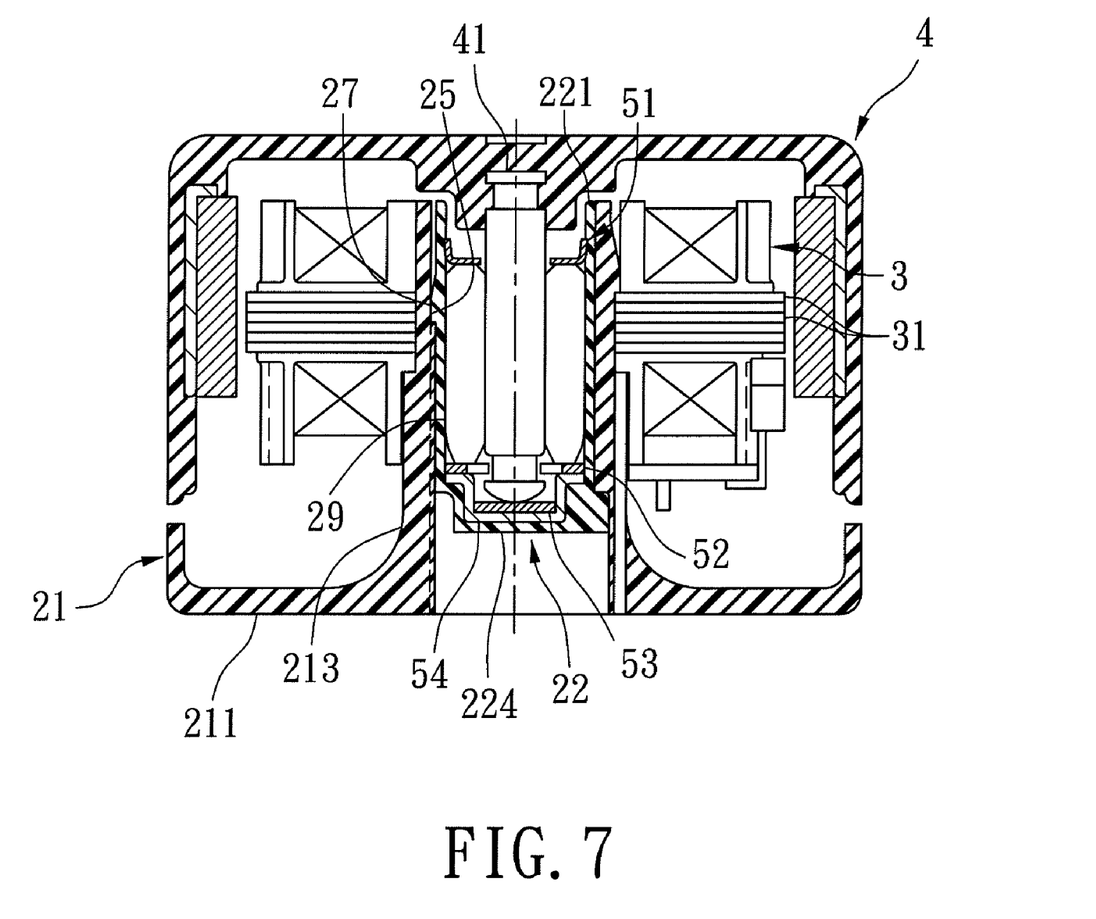
FIG. 7 is a sectional view of the fourth preferred embodiment according to this invention.

Referring to FIG. 7, the fourth preferred embodiment of the motor assembly according to this invention differs from the third embodiment in that a rigid support member 54 is further disposed on the receptacle cap 224 to provide a support for the lower positioning ring 52 and the abrasion-resisting pad 53.

Figure 8:
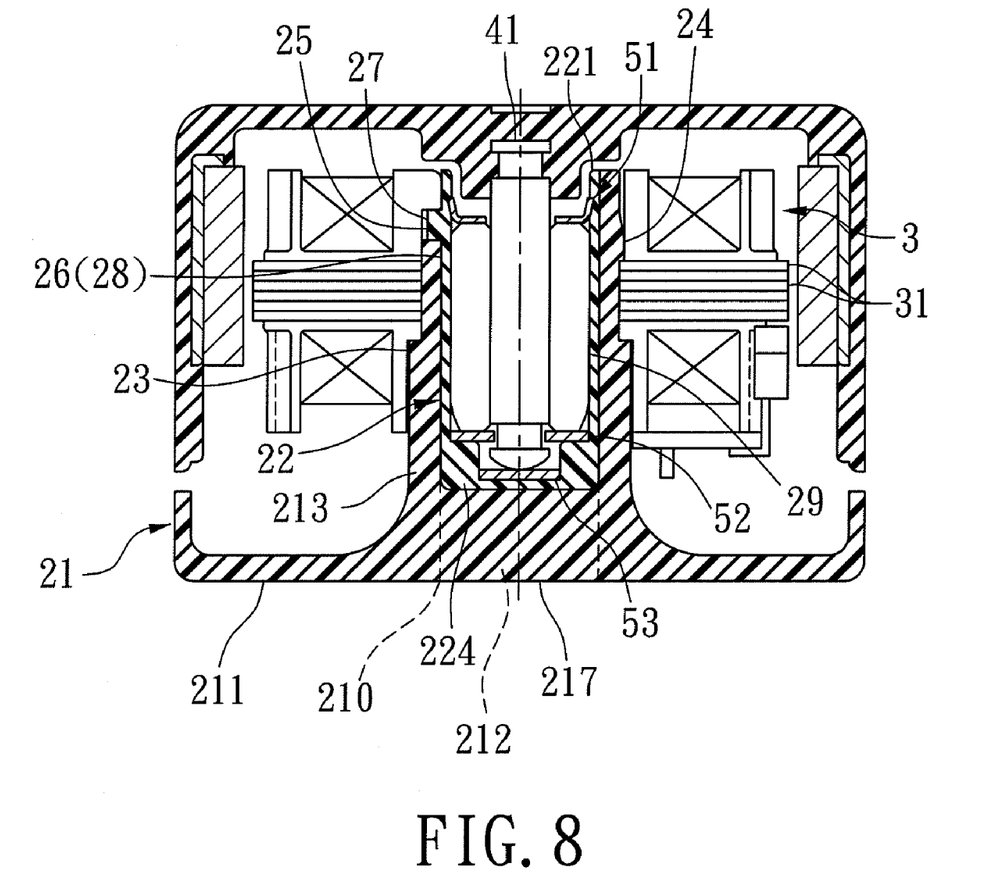
FIG. 8 is a sectional view of the fifth preferred embodiment according to this invention.
Figure 9:
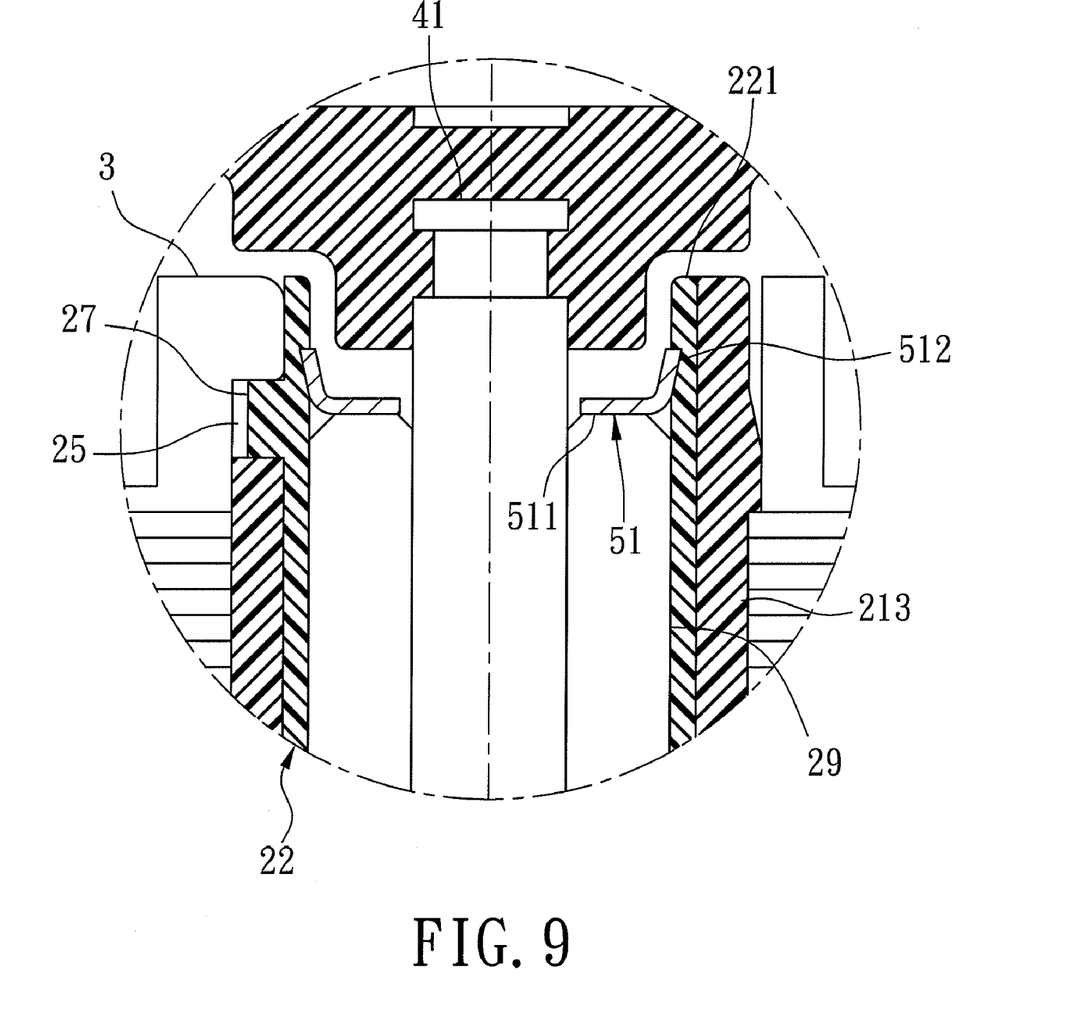
FIG. 9 is an enlarged sectional view of a portion of the fifth preferred embodiment.

Referring to FIGS. 8 and 9, the fifth preferred embodiment of the motor assembly according to this invention differs from the first embodiment in that the base mount 21 further includes a central pedestal portion 217 which extends radially and inwardly from the inner periphery 210 of the base seat 211 to close the central hole 212. The receptacle cap 214 of the mounting shell member is disposed to rest on the central pedestal portion 217.

Figure 10:
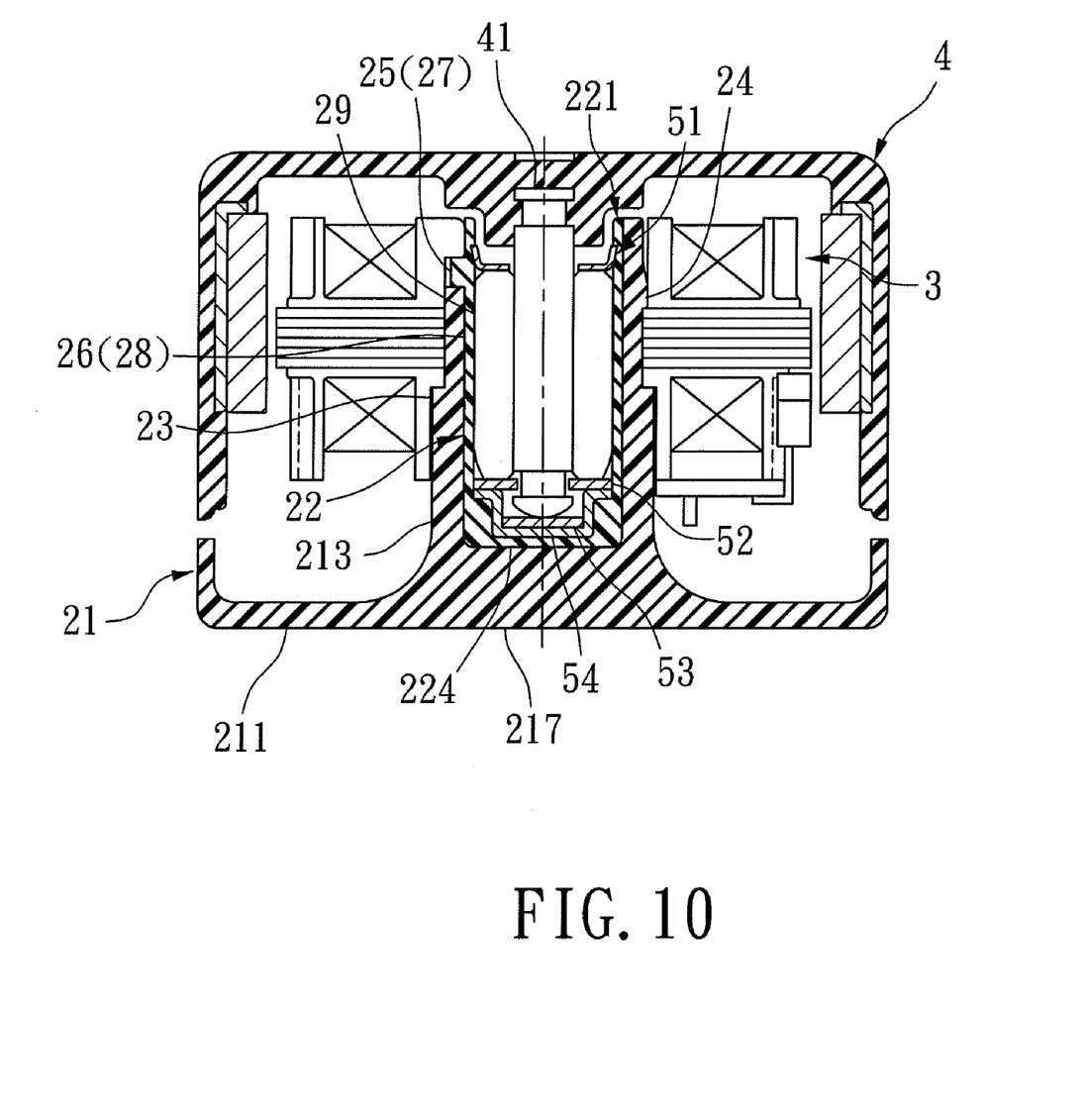
FIG. 10 is a sectional view of the sixth preferred embodiment according to this invention.

Referring to FIG. 10, the sixth preferred embodiment of the motor assembly according to this invention differs from the fifth embodiment in that a rigid support member 54 is further disposed on the receptacle cap 224 to provide a support for the lower positioning ring 52 and the abrasion-resisting pad 53.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A motor assembly comprising:
   a base mount including a base seat which has an inner periphery that surrounds an axis to define a central hole therein, and an axial tube which extends along the axis from said inner periphery to terminate at an upper peripheral end, said axial tube having inner and outer tubular surfaces radially opposite to each other;
   a plurality of support ledges disposed on said outer tubular surface and angularly displaced from one another about the axis;
   a stator winding subassembly including a plurality of laminated cores which are disposed to surround said outer tubular surface of said axial tube, and which are supported by resting on said support ledges;
   a plurality of abutments which are angularly displaced from one another about the axis, and which are disposed on said outer tubular surface of said axial tube adjacent to said upper peripheral end such that, once said upper peripheral end is urged outwardly and radially by virtue of a radial pressing force exerted on said inner tubular surface, said abutments are brought into firm engagement with said laminated cores, thereby further ensuring immobility of said laminated cores between said support ledges and said abutments;
   upper and lower retaining members which are disposed on said inner tubular surface of said axial tube and which are opposite to each other relative to the axis;
   a mounting shell member made from a flexible material, and insertable into said axial tube from one of said upper peripheral end and said inner periphery, said mounting shell member including a tubular shell wall which surrounds the axis, and which has inner and outer shell surfaces radially opposite to each other, and a receptacle cap disposed to engage said inner shell surface;
   upper and lower retained members which are disposed on said outer shell surface of said mounting shell member, and which are configured such that, immediately after said mounting shell member is inserted into said axial tube, said upper and lower retained members are respectively in axial frictional engagements with said upper and lower retaining members so as to guard against axial movement of said mounting shell member relative to said axial tube;
   a rotor subassembly including a revolving shaft extending along the axis;
   an antifriction bearing which is disposed between said revolving shaft and said inner shell surface of said mounting shell member to permit said revolving shaft to revolve about the axis, and which has an upper end and a lower end that is disposed to rest on said receptacle cap; and
   an upper positioning ring which is sleeved on said revolving shaft and which is configured to rest on said upper end of said antifriction bearing.

2. The motor assembly according to claim 1, wherein said receptacle cap has an annular flange portion which surrounds the axis, and which extends radially and outwardly to engage with said inner shell surface so as to form an annular shoulder surface that faces upwardly to support said lower end of said antifriction bearing, and a receptacle body extending from said annular flange portion downwardly to terminate at a bottom bearing surface, said revolving shaft having a frictional revolving end which is brought to rest on said bottom bearing surface.

3. The motor assembly according to claim 2, wherein said upper positioning ring has a ring base sleeved on said revolving shaft and resting on said upper end of said antifriction bearing, and a skirt portion disposed to flare from said ring base, and configured to urge against said inner shell surface of said mounting shell member so as to exert the radial pressing force on said inner tubular surface of said axial tube.

4. The motor assembly according to claim 3, further comprising a lower positioning ring disposed between said lower end of said antifriction bearing and said annular shoulder surface, and configured to fittingly permit said revolving shaft to pass therethrough while guarding against movement of said frictional revolving end away from said bottom bearing surface.

5. The motor assembly according to claim 4, wherein said antifriction bearing is a bearing housing.

6. The motor assembly according to claim 4, further comprising an abrasion-resisting pad disposed between said bottom bearing surface of said receptacle body and said frictional revolving end of said revolving shaft so as to increase wearability of said bottom bearing surface.

7. The motor assembly according to claim 6, further comprising a support member made of a rigid material and configured to be superimposed on said annular shoulder surface and said bottom bearing surface to provide a support for said lower positioning ring and said abrasion-resisting pad.

8. The motor assembly according to claim 1, wherein said upper retaining member and said upper retained member are configured to cooperatively constitute a snap-fit mechanism such that, immediately after said mounting shell member is fully inserted into said axial tube from one of said upper peripheral end and said inner periphery, said upper retained member is snapped into axial frictional engagement with said each of said upper retaining members, and wherein said lower retaining member and said lower retained member are in form of upward and downward step portions so as to be axially and frictionally engaged with each other.

9. The motor assembly according to claim 1, wherein said base mount further includes a central pedestal portion which extends radially and inwardly from said inner periphery of said base seat to close said central hole, said receptacle cap of said mounting shell member being disposed to rest on said central pedestal portion.

10. The motor assembly according to claim 1, wherein said axial tube is integrally molded with said base seat to form said base mount into a single-piece structure.

11. The motor assembly according to claim 1, wherein said receptacle cap is integrally molded with said tubular shell wall to form said mounting shell member into a single-piece structure.

* * * * *